United States Patent [19]

Rawski

[11] Patent Number: 4,815,232
[45] Date of Patent: Mar. 28, 1989

[54] COMB FOR THE REMOVAL AND CAPTURE OF FLEAS AND OTHER PESTS

[76] Inventor: Louis Rawski, 410 Morningside St., North Long Beach, Calif. 90805

[21] Appl. No.: 204,996

[22] Filed: Jun. 8, 1988

Related U.S. Application Data

[63] Continuation-in-part of Ser. No. 88,836, Aug. 24, 1987, abandoned.

[51] Int. Cl.$^4$ .............................................. A01M 3/04
[52] U.S. Cl. ......................................... 43/136; 119/87
[58] Field of Search ................ 43/134, 133, 136, 114, 43/115; 119/87

[56] References Cited

U.S. PATENT DOCUMENTS

| | | | |
|---|---|---|---|
| 506,643 | 10/1893 | Price | 43/134 |
| 656,990 | 8/1900 | Marsh | 43/134 |
| 1,107,537 | 8/1914 | McCann | 43/134 |
| 1,255,601 | 2/1918 | Hare | 43/134 |
| 2,156,416 | 5/1939 | Wikander | 119/87 |
| 4,599,823 | 7/1986 | Lee | 43/134 |

FOREIGN PATENT DOCUMENTS

357840  9/1905  France ................................ 119/87

*Primary Examiner*—Gene P. Crosby

[57] ABSTRACT

The invention provides a device to capture living insects and other debris when combing an animal's coat. It consists of a comb with a sheath attached whereby the coat is combed between the sheath and the comb's teeth. On the inside of the sheath is a dimpled structure containing an adhesive within each dimple. As the animal's coat is combed living insects tend to escape the coat and get caught on the adhesive inside one of the dimples. The dimpled structure may be easily removed when filled with insects and replaced with a fresh one.

6 Claims, 1 Drawing Sheet

COMB FOR THE REMOVAL AND CAPTURE OF FLEAS AND OTHER PESTS

This is a continuation-in-part of application Ser. No. 088,836, filed Aug. 24, 1987, now abandoned.

FIELD OF INVENTION

The invention relates to the grooming of animals both domestic and wild, whereby not only the removal but also the capture of insects and other foreign material, especially fleas, from the animal's coat is desired. The combing device is primarily designed for domestic cats and dogs. However, the principle of the device is applicable to any type or size of animal. The invention may also be used for the combing of rugs, mats, fabrics, coats and other items whereby it is desired to remove and capture worms, insects, larvae or other artifacts for investigative purposes.

DESCRIPTION OF PRIOR ART

The removal of tics, fleas and lice; including adults, pupils and larvae, from the hair of both humans and animals of all sort has traditionally been accomplished primarily by manually combing the hair. A wide variety of comb types exist with both standard and fine-tooth arrangements. The comb acts as a filter allowing the hairs to pass through the space between individual teeth while capturing loose foreign material found within or on an animals coat. Prior art is described by Bachrach in U.S. Pat. Nos. 4,612,944 and 4,612,945 whereby simple combs are developed. Other art described by Shores in U.S. Pat. No. 4,630,329 shows how to use vacuum in conjunction with a combing device; and by O'Connor in U.S. Pat. No. 4,585,018 shows a method for applying insecticide while combing.

With the development of DDT and other pesticides, it became possible to kill pests on animals without the effort and time investment required by manual combing. For domestic animals, especially those living in the same spaces as humans, it is generally undesirable to use poisons. This is especially true around children and babies.

Currently, a combination of poisons in the form of powders, aerosols and sprays are used in conjunction with manual grooming including combing, for household pets i.e., dogs and cats. Sprays, shampoos, collars and other methods of bringing insecticides into contact with the animal are in common use today.

OBJECTS AND ADVANTAGES

We claim the following as the objects and advantages of the invention: to provide a device to allow the capture of fleas and other pests during the combing of animals especially domestic cats and dogs, to provide a device with such a capability where a large volume of foreign material can be captured and stored so that the effectiveness of the device is not quickly diminished by the capture and retention process, to provide such a device whereby the capturing mechanism is easily replaced when fully loaded whereby its effectiveness is restored, and to provide such a device which can operate without the use of poisons or other means causing potentially negative side effects.

Another advantage of the claimed device is that the design of the capture structure is such that loose hairs, dust, particles from the skin and loose particulate in general will not be captured within the same area as live insects and will not therefore, tend to fill up or clog the capture surface. Therefore the device will tend to have a relatively long span of usefulness providing extended utility. Insects which flee the coat and become caught by the device will tend to become segregated from other inanimate debris thus allowing post-grooming inspection of insect species. This feature permits the device to be useful for investigative purposes.

Further objects and advantages will become apparent from a consideration of the drawings and description.

SUMMARY OF THE INVENTION

The present invention extends the capability of the common comb whereby material loosened by combing action, especially insects or other material are captured as the comb moves through the animals coat.

The present apparatus comprises a comb with closely spaced teeth thereby having the capability to mechanically capture and pick up fine material including insects, which are caught or resting within an animal's coat, and move them out of their original resting location. Attached to the comb is a scoop shaped sheath which covers the entire comb and is set at a fixed angle to the comb whereby a specific opening exists between the face of the comb and the sides of the sheath. Attached to the interior of the sheath is a flat honeycombed surface which has an adhesive deposited on the sides and bottom of each of a multitude of surface impressions.

During combing action the comb, sheath, and honeycomb assembly moves as a unit through the animal's coat. The hairs cannot touch the adhesive which is inside small depressions and therefore it slides easily past the honeycomb's surface, however, there is a high probability that the flea, in its haste to escape the combing device will jump off the animal's coat and be caught inside one of the honeycombs impressions. The adhesive formula incorporates a scent agent which is attractive to the flea. Because of the small angle between the sides of the sheath and the face of the comb the flea has little chance to escape in a direction lateral to combing action, once he is caught inside the combing device. The flea will either stay on the hair and be caught between two adjacent teeth of the comb, or he will try to leave the animals coat into the honeycomb and be caught by the adhesive. The adhesive is designed to act like flypaper to hold the flea until he dies. Because the leading edge of the sheath pushes the animal's coat down, there is a tendency for the individual hairs to rebound or spring back upward. This action causes loose materials and insects to be ejected upward in the direction of the adhesive, and thus to become captured.

One embodiment of the device includes a door which, when closed completely covers the opening between the teeth of the comb and the sheath's leading edge. This door is pushed into its open position by the hairs of the coat being combed and is forced back into the closed position, when combing is finished, by tension in its hinge. This door prevents live insects from escaping from the space within the sheath.

DRAWING REFERENCE NUMERALS

10 Comb
12 Tooth (typical)
20 Sheath
22 Sheath's Side
24 Sheath's Leading Edge
30 Insert
32 Cylindrical Impression (typical)
34 Attachment Adhesive
36 Capture Adhesive
40 Collected Debris
42 Captured Insect
50 Animal's Coat
55 Animal's Skin
60 Door
60' Door shown in open position
62 Hinge

DESCRIPTION OF PREFERRED EMBODIMENT

Figure 1:
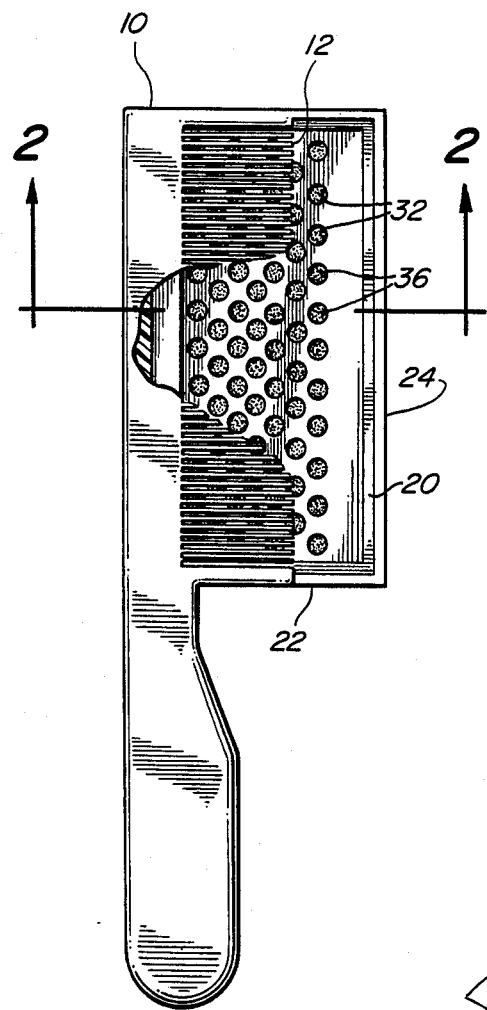
FIG. 1 illustrates the apparatus of the invention showing the several elements in the preferred embodiment.

FIG. 1 shows that the invention contains a standard fine tooth comb (10). A sheath (20) is integrally molded to the comb (10) and contains two flat sides (22) and a leading edge (24). Inside of the sheath (20) is an insert (30) which contains a large number of cylindrical impressions (32).

Figure 2:
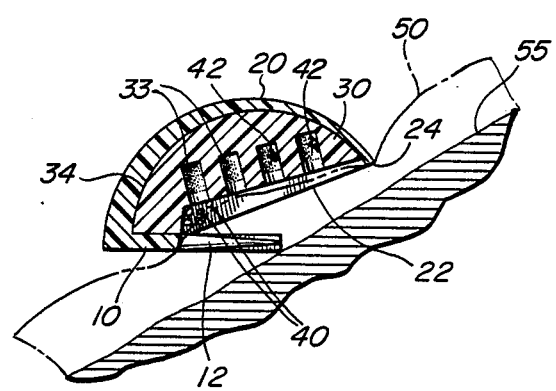
FIG. 2 is a cross section view of FIG. 1, showing details of construction and the method of capture of insects and other debris.

FIG. 2 shows a cross section of the invention. This view clearly shows that the sheath (20) is molded together with the comb (10). The insert (30) is held within the sheath (20) by an adhesive (34) on that surface of the insert (30) which makes contact with the sheath (20). The cylindrical impression (32) in the insert (30), contain a small amount of a non-hardening adhesive (36) which is restricted to the bottom half of the impressions (32).

Figure 3:
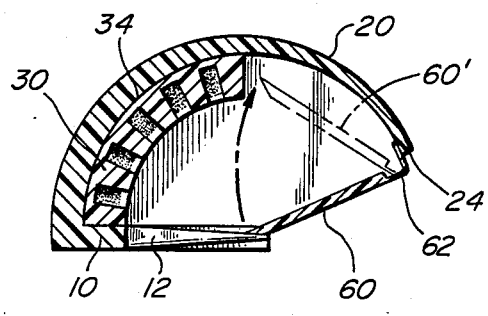
FIG. 3 is a cross section view similar to FIG. 2 except depicting an alternate embodiment of the device having a door which seals the opening of the sheath.

FIG. 3 shows a cross section of the invention with an alternate construction with respect to that shown in FIG. 2 above. All features of the device shown in FIG. 2 are shown also in FIG. 3 plus two additional features are added. The first of these two additional features is as shown in FIG. 3; the two flat sides (22) of sheath (20) are extended to meet the comb's teeth (12). The second of the additional features is a door (60) and its hinge (62), both integrally molded as part of the sheath and extending across the entire space between the two flat sides (22) such that when in its normally closed position it bridges the space from the end of the comb's teeth (12) to the sheath's leading edge (24).

OPERATION OF THE INVENTION

Installation of the insert

The adhesive (34) which holds the insert (30) in place is non-hardening so that the insert (30) may be cleanly removed with a pocket knife or other pointed object. A new insert (30) is easily installed after removing a waxed protective cover from the adhesive surface (34) by simply pressing the insert (30) into position inside the sheath (20).

Operation

The invention is used in a manner similar to a common comb. As shown in FIG. 2, the comb (10) is inserted into the animal's coat (50) with the comb's teeth (12) facing in the direction in which the animal's coat (50) grows. The comb (10) is held at an angle such that the sheath's leading edge (24) presses down on the coat (50). The tips of the comb's teeth (12) touch the animal's skin (55) preventing insects and insect eggs from escaping.

As the comb (10) moves through the coat (50), the leading edge (24) presses the coat (50) down, and after passing, releases individual hairs causing them to spring back up. This springing action results in the throwing off of debris and insects lieing within the hairs. The animal's coat (50) is brought into intimate contact with the outer surface of the insert (30) but does not touch the adhesive located inside the impressions (32). The interior of the impressions (32) contain a scent which is attractive to fleas and other insects (42).

Since debris (40) combed from the coat (50) is not able to pass through the comb's teeth (12) it accumulates at the base of the teeth (12) and eventually is removed with the discarded insert (30).

Insects living within the coat (50) of the animal will tend to move to escape the comb (10). Those that jump upward and out of the coat (50) become captured within the impressions (30).

As the comb (10) moves through the coat (50), the coat pushes against the door (60) pushing it into the open position (60'). The door (60) is held in the open position (60') by the coat (50) as long as combing action continues. When the comb (10) is removed from the coat (50), the door (60) swings into the closed postion resting against the comb's teeth (12). There is too little clearance between the sides of the door (60) and the two flat sides (22) for live insects to escape. The interior open space defined by the inside surfaces of the comb (10), sheath (20), insert (30), two flat sides (22) and the door (60), is a trap for live insects captured during combing since there is no opening through which they can escape.

CONCLUSION, RAMIFICATIONS AND SCOPE OF THE INVENTION

The present invention provides means for capturing the material removed from an animals coat by combing. While the above description contains many specifics, these should not be construed as limitations on the scope of the invention, but rather as an exemplification of one preferred embodiment thereof. Many other variations are possible. For instance the assembly may be held by a number of possible handle types attached to the sheath or the comb or both. A handle which protrudes from the backside of the sheath provides a method for holding the device equally well with either hand allowing trade-off when one hand is tired. The shape of the insert and the angle between the comb and the sideshields may be varied to allow use with different thicknesses or types of coats and to capture different size insects and debris.

Accordingly, the scope of the invention should be determined not by the embodiment illustrated, but by the appended claims and their legal equivalents.

What I claim is:

1. A device for removing and capturing inanimate debris or living creatures from the coat of an animal, comprising:
    (a) a comb consisting of a base containing attachment means to hold teeth aligned parallel to each other in a linear array and in which the spacing of said teeth permits the passage of said coat of said animal
    (b) a sheath consisting of a box shaped structure open on one side and containing attachment means to hold said base firmly along one edge of said open side (c) a dimpled structure containing attachment means so that it fits fixedly to the interior of said sheath and containing adhesive within said dimples.

2. The device of claim 1 wherein means is provided to easily replace said dimpled structure.

3. The device of claim 1 wherein said adhesive contains an insect attracting agent.

4. The device of claim 1 wherein said adhesive contains an insecticide.

5. The device of claim 1 wherein a door is attached by a flexible hinge to said sheath whereby said door, in its closed position, is held against said comb by spring action within said hinge such that said door covers the entire opening between said sheath and said comb; and said sheath provides a storage space for said door, in its open position, such that the entire opening between said sheath and said comb is unobstructed by said door.

6. A device for removing and capturing inanimate debris or living creatures from any structure which can be combed, comprising:

(a) a comb consisting of a base containing attachment means to hold teeth aligned parallel to each other in a linear array and in which the spacing of said teeth permits the passage of said structure which can be combed (b) a sheath consisting of a box shaped structure open on one side and containing attachment means to hold said base firmly along one edge of said open side (c) a dimpled structure containing attachment means so that it fits fixedly to the interior of said sheath and containing adhesive within said dimples.

* * * * *